United States Patent Office.

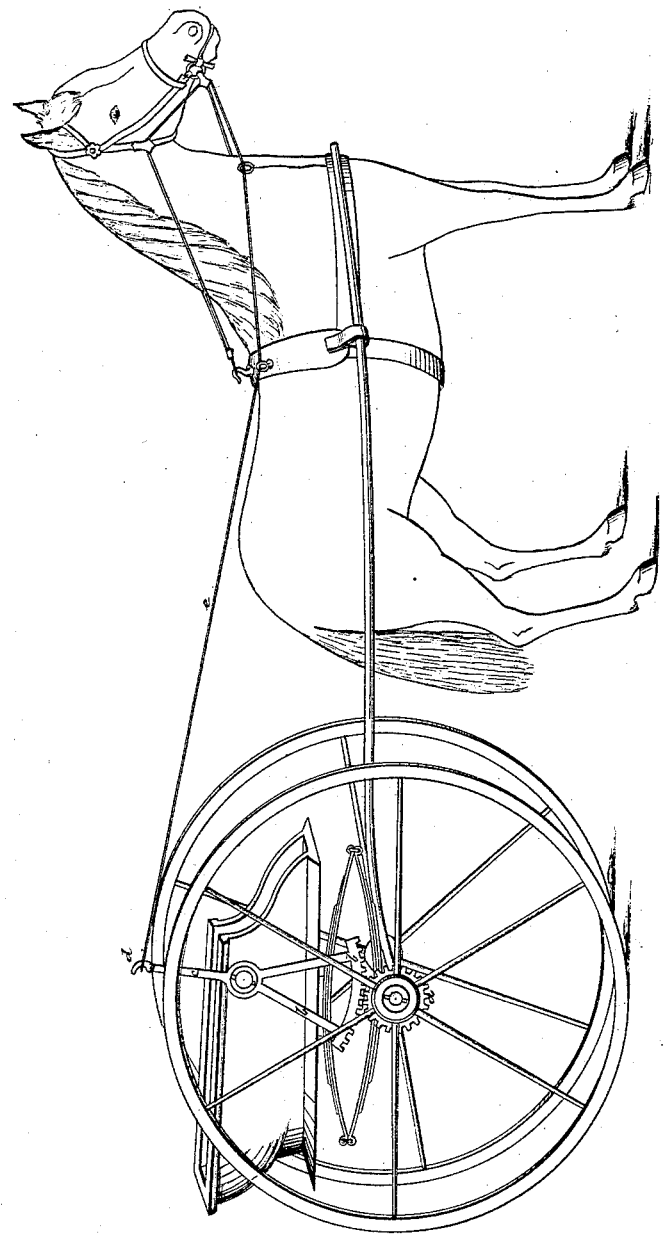

GEORGE W. GOODWYN, OF PETERSBURG, VIRGINIA.

Letters Patent No. 111,924, dated February 21, 1871.

IMPROVEMENT IN HORSE-HOLDER ATTACHMENTS TO CARRIAGES.

The Schedule referred to in these Letters Patent and making part of the same.

*To all whom it may concern:*

Be it known that I, GEORGE W. GOODWYN, of Petersburg, in the county of Dinwiddie and State of Virginia, have invented a new and Improved Horse-Holder Attachment to Carriages or any vehicle with wheels; and I do hereby declare the following to be a full, clear, and exact description of the same, reference being had to the accompanying drawing making a part of this specification, in which the figure is a perspective view.

This invention relates to an improvement upon devices hitherto used for preventing horses from running away with wheeled vehicles, and consists in a peculiarly simple arrangement of a lever, having a toothed sector-shaped end which engages with a pinion on the axle or hub of one of the wheels, and is attached to the side of the carriage, as hereinafter fully explained.

Referring to the drawing—

$a$ is a cogged ring, attached to the inner end of the hub of one of the wheels A of the carriage, therein shown.

$b$ is a cogged sector, pivoted to the side of the carriage-body, or to a post extending upward from the axle, immediately above the cogged ring, and at such a distance therefrom as to engage therewith whenever the sector is turned down.

$c$ is an arm extending from the apex of the sector, and provided with a horn, $d$, or horns, at its outer extremity, to which to fasten the rear end of the strap $e$, the front end of which is secured to the bit.

The arm $c$ should be heavier than the sector $b$, so as to keep the latter raised above the cogged ring except when turned down into connection with it.

The sector and ring are to be brought together whenever the carriage stops and its occupant gets out and leaves the horse standing.

If, during the absence of the driver, the horse starts to move off, he is instantly checked by the strain brought on the strap $e$ by the drawing of the sector forward and the throwing of the arm backward through the instrumentality of the cogged ring.

Having thus described my invention,

What I claim as new, and desire to secure by Letters Patent, is—

The lever $b\ c\ d$, pivoted to the side of the carriage, and engaging with the toothed ring $a$ on the hub of the wheel, as shown and described.

GEORGE W. GOODWYN.

Witnesses:
 JAS. M. B. STEWARD,
 J. F. T. YOUNG.

*Assignor to himself & B. J. Winfield of same place.*